(12) United States Patent
Chan et al.

(10) Patent No.: US 9,727,656 B2
(45) Date of Patent: Aug. 8, 2017

(54) INTERACTIVE SITEMAP WITH USER FOOTPRINTS

(71) Applicant: YAHOO! INC., Sunnyvale, CA (US)

(72) Inventors: Hsuan-Hao Chan, Taipei (TW); Yi-Chun Chuang, Taipei (TW); Ting-Liang Chou, Taipei (TW)

(73) Assignee: Excalibur IP, LLC, Sunnyvale, CA (US)

( * ) Notice: Subject to any disclaimer, the term of this patent is extended or adjusted under 35 U.S.C. 154(b) by 495 days.

(21) Appl. No.: 13/935,514

(22) Filed: Jul. 4, 2013

(65) Prior Publication Data

US 2015/0012811 A1 Jan. 8, 2015

(51) Int. Cl.
*G06F 17/00* (2006.01)
*G06F 17/30* (2006.01)

(52) U.S. Cl.
CPC .............. *G06F 17/30873* (2013.01)

(58) Field of Classification Search
CPC .................................................. G06F 17/30873
See application file for complete search history.

(56) References Cited

U.S. PATENT DOCUMENTS

| | | | | |
|---|---|---|---|---|
| 6,732,090 B2* | 5/2004 | Shanahan | ......... | G06F 17/30011 |
| 6,897,885 B1* | 5/2005 | Hao | .................. | G06F 17/30905 |
| | | | | 707/E17.011 |
| 6,944,818 B2* | 9/2005 | Newman | ........... | G06F 17/30961 |
| | | | | 345/619 |
| 7,076,736 B2* | 7/2006 | Hugh | .................. | G06F 17/3056 |
| | | | | 707/999.008 |
| 7,689,525 B2* | 3/2010 | Drucker | .............. | G06F 17/3002 |
| | | | | 706/45 |
| 7,912,752 B2* | 3/2011 | Subramanian | .... | G06F 17/30867 |
| | | | | 705/14.4 |
| 7,970,664 B2* | 6/2011 | Linden | ................... | G06Q 30/02 |
| | | | | 705/26.1 |
| 7,984,389 B2* | 7/2011 | Rusu | ..................... | G06F 3/0481 |
| | | | | 715/850 |

(Continued)

OTHER PUBLICATIONS

Hightower, et al., "Graphical Multiscale Web Histories: A Study of PadPrints" in Proceedings of the ACM Hypertext 98 Conference, p. 1-9, available at http://www.cs.umd.edu/hcil/pad++/papers/hypertext-98-padprints.*

(Continued)

*Primary Examiner* — Amelia Tapp
(74) *Attorney, Agent, or Firm* — Cooper Legal Group, LLC

(57) ABSTRACT

A system and method for generating an interactive sitemap of a website includes steps of: receiving an identifier of a user visiting the website; storing identifiers of the website pages visited by the user; associating the website page identifiers with the user identifier; capturing a snapshot of each website page visited by the user; determining website pages recommended for the user, but not yet visited by the user; capturing a snapshot of at least one recommended website page; and generating the interactive sitemap that includes a sitemap tree structure of the website with selectable nodes representing the website pages visited by the user and the website pages recommended for the user. When the user rolls over one of the selectable nodes, presenting the snapshot within the in-page window.

20 Claims, 15 Drawing Sheets

(56) References Cited

U.S. PATENT DOCUMENTS

| | | | | |
|---|---|---|---|---|
| 8,117,281 B2* | 2/2012 | Robinson | ......... | G06F 17/30867 709/217 |
| 8,255,819 B2* | 8/2012 | Chang | ............... | G06F 17/30867 715/760 |
| 8,341,146 B1* | 12/2012 | Bleckner | ........... | G06F 17/30864 707/722 |
| 2002/0002571 A1* | 1/2002 | Manohar | ........... | G06F 17/30873 715/273 |
| 2005/0028089 A1* | 2/2005 | Aoki | ................ | G06F 17/30899 715/205 |
| 2006/0288023 A1* | 12/2006 | Szabo | ............... | G06F 17/30067 |
| 2008/0294584 A1* | 11/2008 | Herz | ................. | G06F 17/30867 706/46 |
| 2010/0281364 A1* | 11/2010 | Sidman | ............ | G06F 17/30595 715/713 |
| 2011/0022606 A1* | 1/2011 | Mason | ................... | G06Q 30/02 707/748 |

OTHER PUBLICATIONS

Boris Diebold and Michael Kaufmann. 2001. Usage-based visualization of web localities. In Proceedings of the 2001 Asia-Pacific symposium on Information visualisation—vol. 9 (APVis '01), vol. 9. Australian Computer Society, Inc., Darlinghurst, Australia, Australia, pp. 159-164.*

* cited by examiner

FIG. 6

INTERACTIVE SITEMAP WITH USER FOOTPRINTS

CROSS-REFERENCE TO RELATED APPLICATIONS

None.

FIELD OF THE INVENTION

The invention disclosed broadly relates to the field of sitemaps, and more particularly relates to the field of interactive sitemaps.

BACKGROUND OF THE INVENTION

A sitemap, as defined by Wikipedia is: "A site map (or sitemap) is a list of pages of a web site accessible to crawlers or users. It can be either a document in any form used as a planning tool for Web design, or a Web page that lists the pages on a Web site, typically organized in hierarchical fashion." A sitemap provides guidance for visitors to a website who want to know about the website structure and the services provided on that website. In some cases, the sitemap is also referred to as a site index. This is the case with the United States Patent & Trademark Office (USPTO) website. The USPTO site index link is displayed on the very bottom of the website. This is also a very common location for the sitemap or site index link; it is usually delegated to the bottom of a page.

Referring now to FIG. 1, there is shown a print screen of a sitemap 100 for the website www.weather.com (The Weather Channel), according to the known art. A look at this sitemap 100 provides quite a bit of information about what is available on the website, much more so than the information revealed in the menu bar 120.

Clearly, a sitemap is a good reference for a user who wants to know what a website can offer. When one considers that sitemaps are so commonly found in websites and also considering how much information they can provide, they are relatively unappealing and even meaningless to users.

There is a need for a system and method that provides a more meaningful and richer user experience in navigating a sitemap.

SUMMARY OF THE INVENTION

Briefly, according to an embodiment of the present disclosure, a method for generating an interactive sitemap includes steps or acts of: receiving an identifier of a user visiting the website; storing identifiers of the website pages visited by the user; associating the website page identifiers with the user identifier; capturing a snapshot of each website page visited by the user; determining website pages recommended for the user, but not yet visited by the user; capturing a snapshot of at least one recommended website page; and generating the interactive sitemap that includes a sitemap tree structure of the website with selectable nodes representing the website pages visited by the user and the website pages recommended for the user. When the user rolls over one of the selectable nodes, presenting the snapshot within the in-page window.

According to another embodiment of the present disclosure, an information processing system for generating an interactive sitemap of a website includes, inter alia, the following components: a processor device; and a memory device operably coupled with the processor device. The memory device holds the computer-executable instructions for performing the method steps above.

In yet another embodiment of the present disclosure, a computer program product includes a non-transitory computer-readable storage medium with computer-executable instructions stored therein. The computer-executable instructions, when executed, cause a computer device to perform the method steps above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 6 shows a redirect to the URL represented in the page snapshot of FIG. 5, according to an embodiment of the present disclosure;

Figure 1:
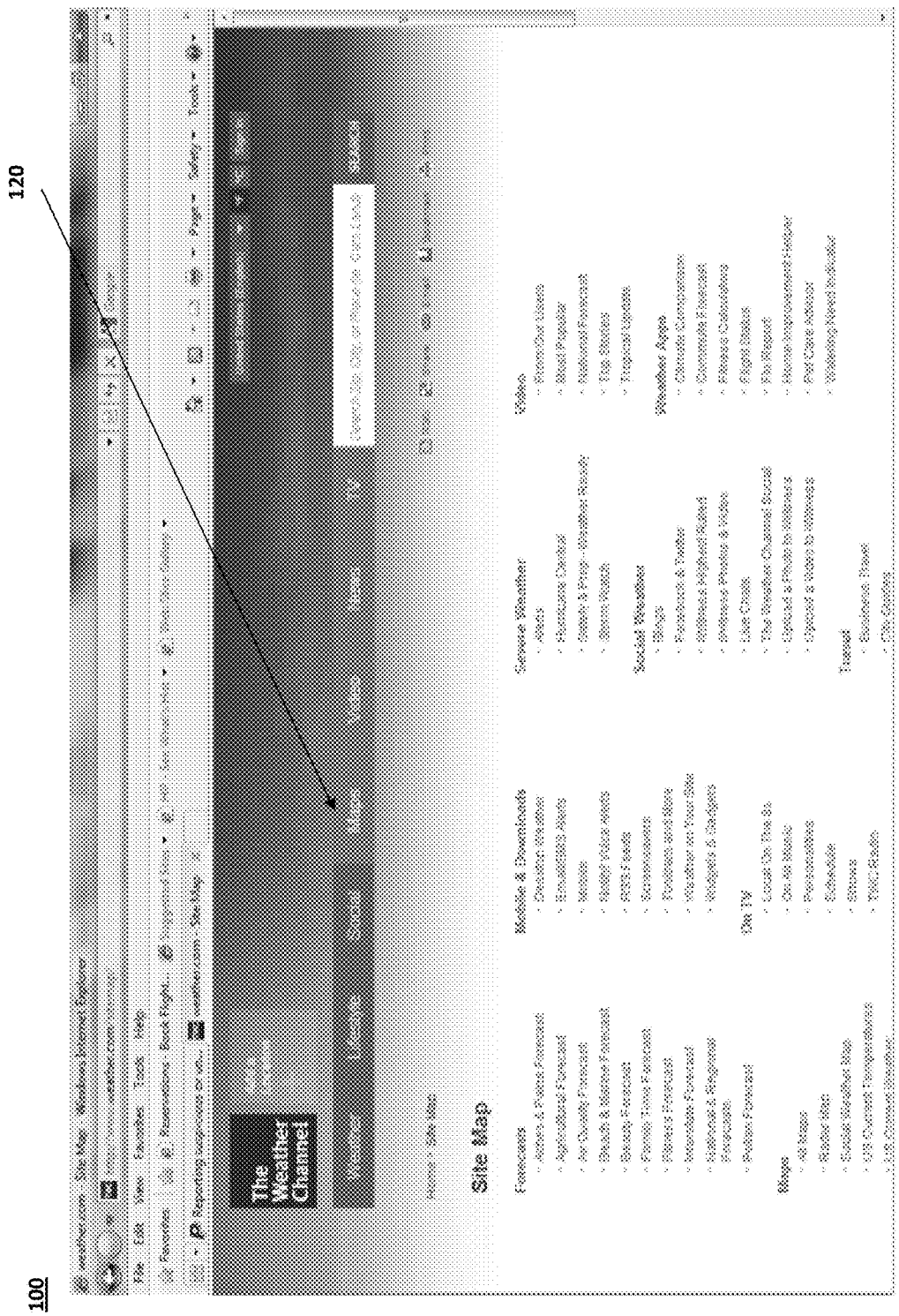
FIG. 1 is a screenshot of a sitemap, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We discuss an interactive sitemap allowing a user to identify and easily traverse and re-visit previously viewed web pages, whether the web pages were visited in a current session or in previous sessions, thus allowing the user to navigate to different properties of a website in a more elegant user experience. The present disclosure will now be described with respect to FIGS. 2-13 which are block diagrams, exemplary screenshots, and flowchart illustrations of embodiments of the present invention. It will be understood that each block of the flowchart illustrations and/or block diagrams, and combinations of blocks in the flowchart illustrations and/or block diagrams, can be implemented by computer program instructions.

Figure 2:
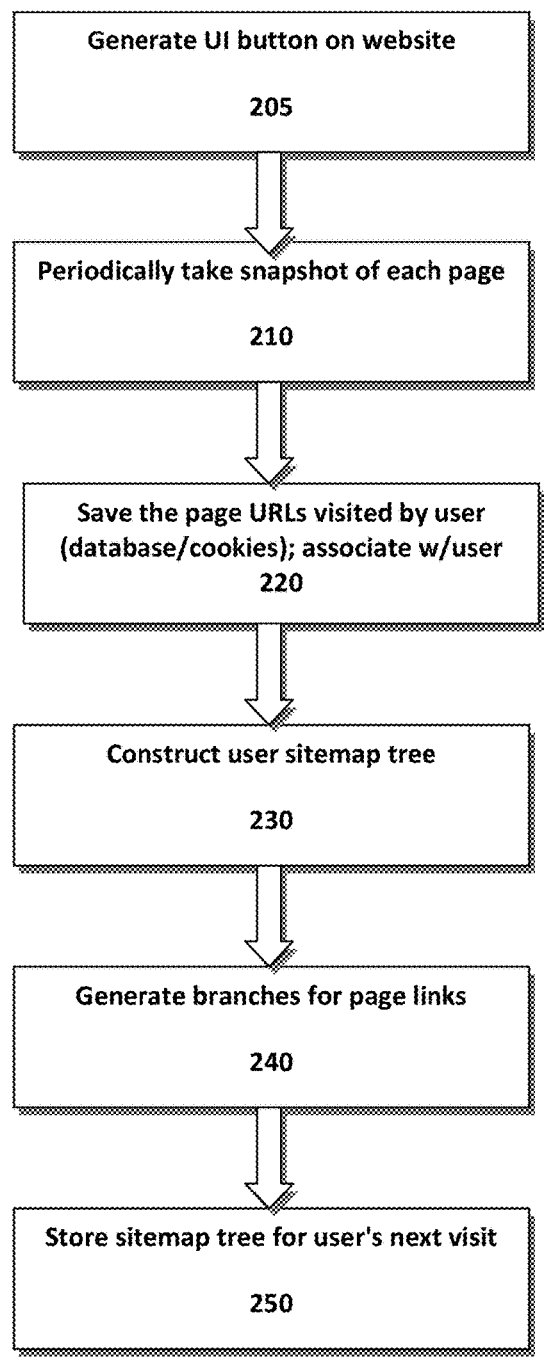
FIG. 2 is a flowchart of a method for constructing an interactive sitemap, according to an embodiment of the disclosure.

Referring now to FIG. 2, there is illustrated a high-level flow chart illustrating a method for constructing an interactive sitemap, according to an embodiment of the present disclosure. The method begins at step 205 wherein the system generates a user interface (UI) button or tab on a website. The user indicates a preference for the interactive sitemap by selecting the UI button. Selecting the UI button, in turn, triggers the system to present the interactive sitemap, rather than the default sitemap that is known in the art.

In step 210 the system for constructing an interactive sitemap takes snapshot previews for each webpage visited by the user, and for any default and/or recommended pages. The snapshots are taken periodically, at time of visit, at time of web page refresh, or at pre-determined intervals. The snapshot function of the interactive sitemap generation is a cache functionality, especially beneficial for the default nodes (web pages) and recommended nodes (web pages). By taking the periodic snapshots, the screenshots are already generated and ready to display when the user mouses over one of these nodes.

Figure 14:
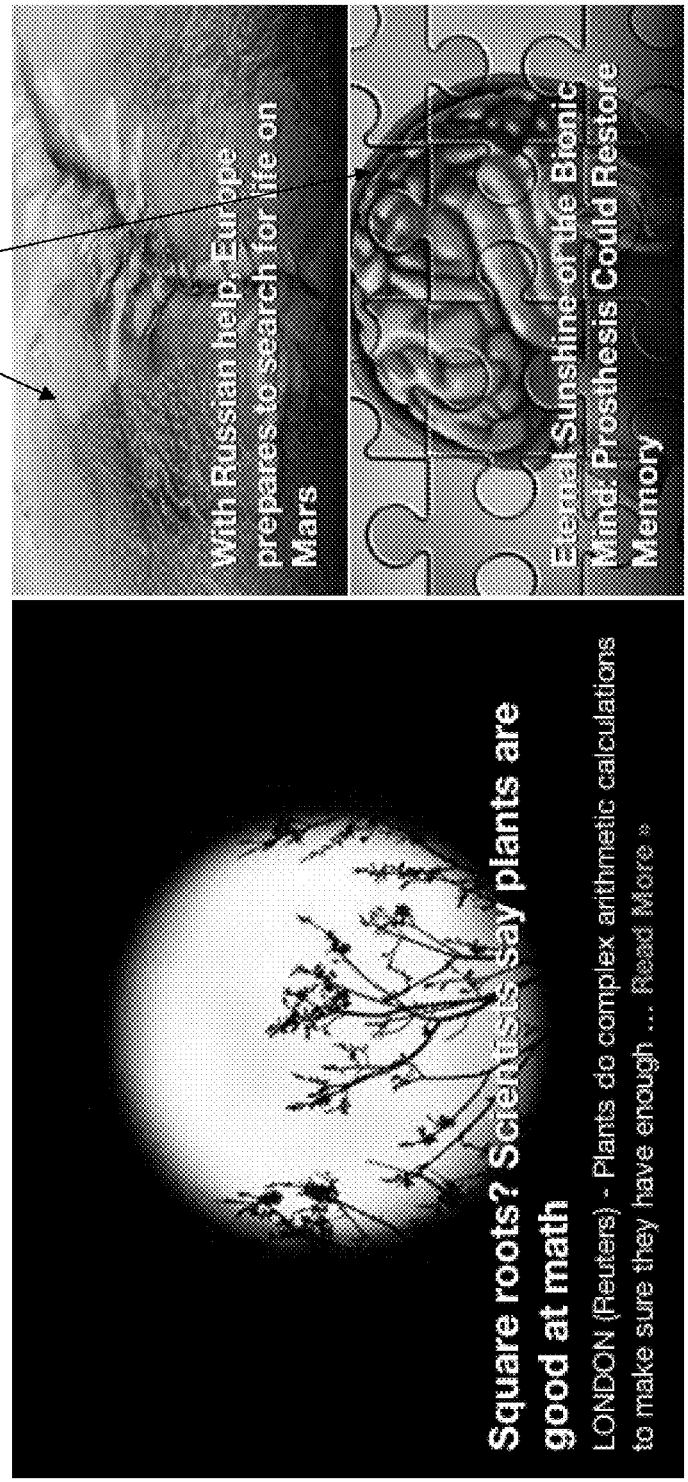
FIG. 14 is an exemplary snapshot of an editorial page, according to an embodiment of the present invention.

We define two categories of web pages: Editorial Pages and User Generated Content (UGC) Pages. If the node represents an Editorial Page, a cache system runs in the background. Referring now to FIG. 14, we provide an example of a snapshot using the cached web page http://news.yahoo.com/science/ of Yahoo! News 1400 as a default node for the "Science" branch. In one embodiment of the present disclosure, the current, or trending, cover story (stories) 1415 is (are) used as the snapshot for the node. Because the cover story will dynamically change due to the posting of new articles, in this scenario the snapshot can be taken by the cache system whenever a new article is posted.

Figure 15:
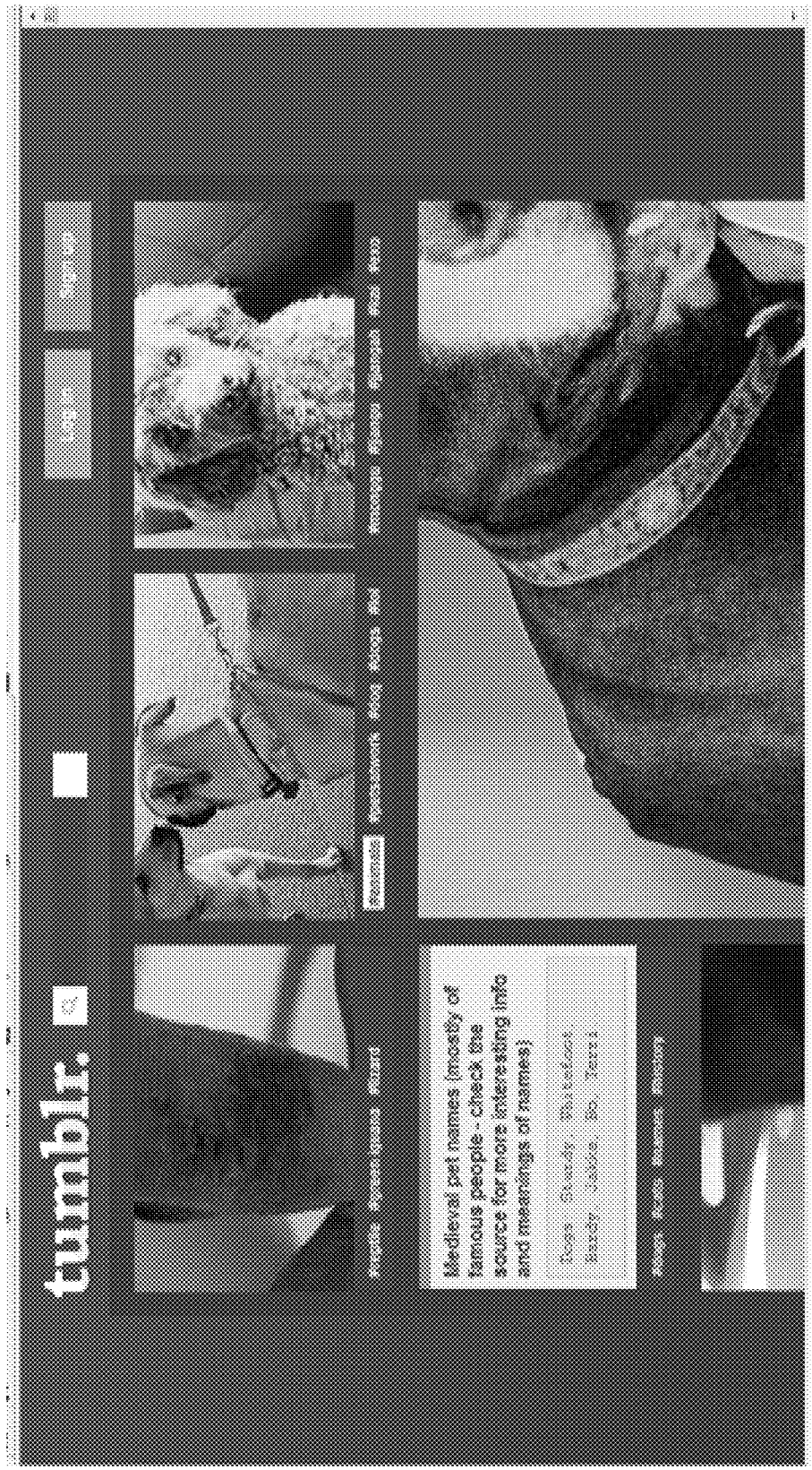
FIG. 15 is an exemplary snapshot of a user generated content (UGC) page, according to an embodiment of the present invention.

Referring now to FIG. 15 we show an exemplary snapshot 1500 for a UGC Page. Here we display a "tumblr." web page "Pets" at http://www.tumblr.com/tagged/pets. Because the content of a UGC page such as this one changes due to frequent posts tagged within the 'Pets' category, we introduce a mechanism to capture the web page image as a snapshot at predetermined time intervals (for example, every hour) to ensure that the node snapshot preview is up-to-date, while not wasting computing resource time comparing the current web page to each web page updated with a new post. The snapshot will likely be a screenshot showing only a portion of the page.

In step 220 the identifying information for the web page such as the URLs (uniform resource locators) are stored and associated with the user. The association is accomplished as follows: for login users, the page URLs are saved to a database; for non-login users, the page URLs are saved to browser cookies which are already associated with the user; or in the alternative, the URLs are stored in a data store in a table or index that associates a URL with a user. In this manner any user, even one who has not registered, can interact with the sitemap.

In one embodiment of the present disclosure, in step 230 we construct a sitemap tree personalized for the user according to the main functions and/or properties of the website, with selectable nodes of the sitemap tree representing the different viewable web pages from the website. For a user's first visit to the website, we provide default selectable nodes (pages) on the sitemap tree for the user to select. Using a Yahoo! News page as an example (http://news.yahoo.com/) the default nodes represent the landing pages of the categories on the top menu bar—'World', 'Politics', 'Tech' . . . and so on. The user can traverse between each category in the interactive sitemap.

Assume the user has visited several pages, with his/her focus on viewing articles in the 'Health' category. The interactive sitemap will recognize the user's interests, which in this case is 'Health,' and easily present the Health nodes on the tree as a way to return to or initiate a visit to the pages of interest. Once the system has "learned" that the user has a preference for the pages in the 'Health' category (branch), that branch will be populated with selectable recommended nodes that the user can preview (with a snapshot).

The algorithm to build the sitemap tree will likely generate new nodes in a downward direction such that the new nodes will appear on the tips of each "branch" of the tree and on the bottom of the tree. Older nodes will be dropped (eliminated) to keep the sitemap tree clutter-free. Limiting the number of nodes saves the sitemap space for more currently relevant nodes while providing an up-to-date personalized experience.

In step 240 the sitemap tree is populated with branches representing the different page links associated with the nodes. For a first time visit, there is no history available for the user. In this scenario, we generate the branches, using one or two recommended links. The recommended links that are selected by the system depend on the type of website and which pages are going to be promoted. The types of website can be roughly divided into two types: content sites and e-commerce sites. For a content site such as Yahoo! News, for example, the recommended links will likely be pages from "Top Stories" and/or "Breaking News." For an e-commerce website, the recommended links will likely be the web pages for Current Bestsellers and/or Editor's Picks.

Figure 4:
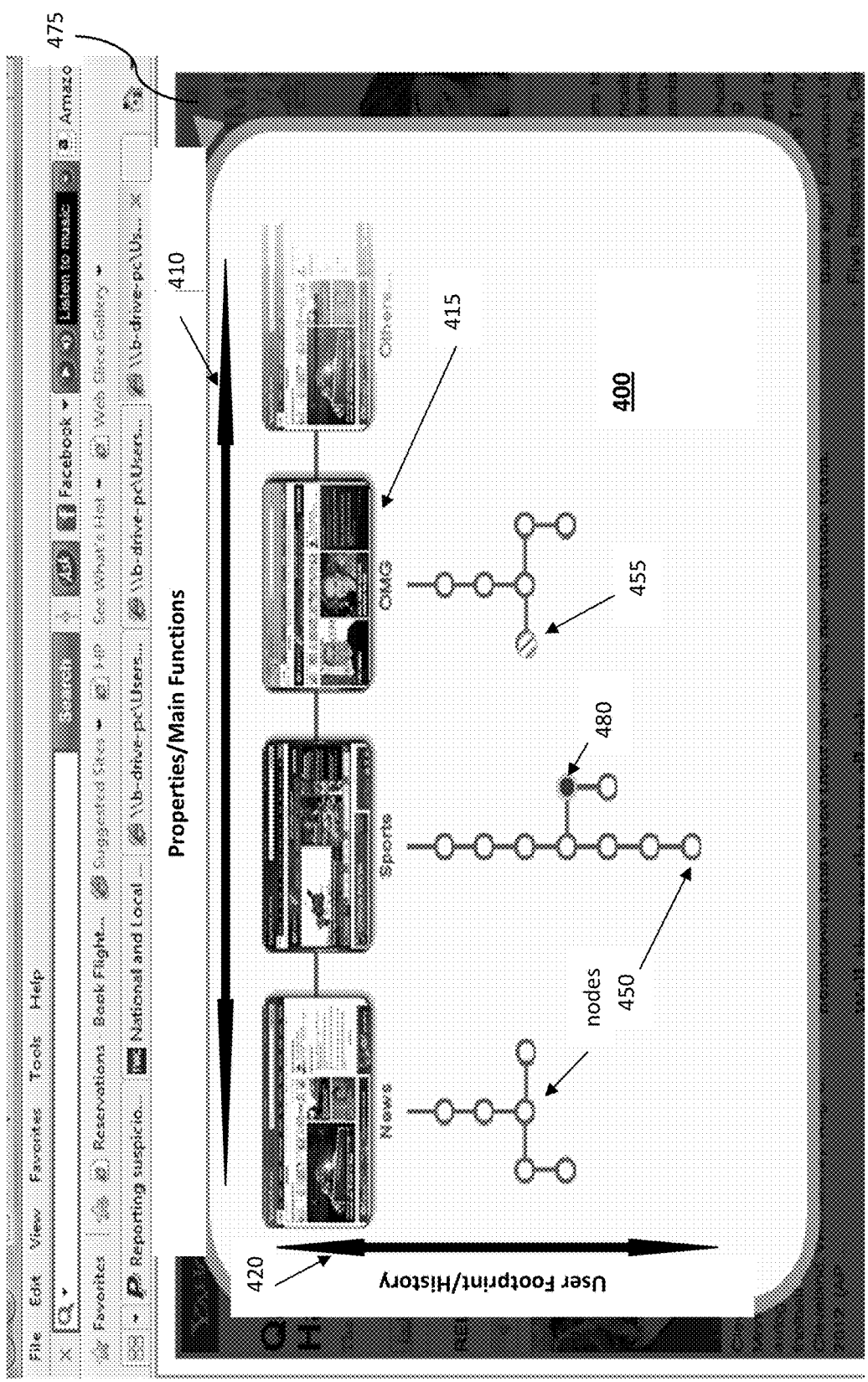
FIG. 4 shows an interactive sitemap, according to an embodiment of the present disclosure.

For any subsequent visit to the interactive sitemap, it is likely that some system-generated branches will be replaced by the page links selected by the user. In order to distinguish the nodes from the "recommended" links versus the nodes from the user-selected page links, we display the recommended nodes differently. They can be displayed in a different color or font, de-emphasized (greyed out), highlighted, underlined, or with any other distinguishing feature, as compared to a visited node. Lastly, in step 250 we store the sitemap tree with all appended nodes so that it is available for the user's next visit to that website, and the user's selection of the interactive sitemap by selecting the UI button (as shown in FIG. 4).

Figure 3:
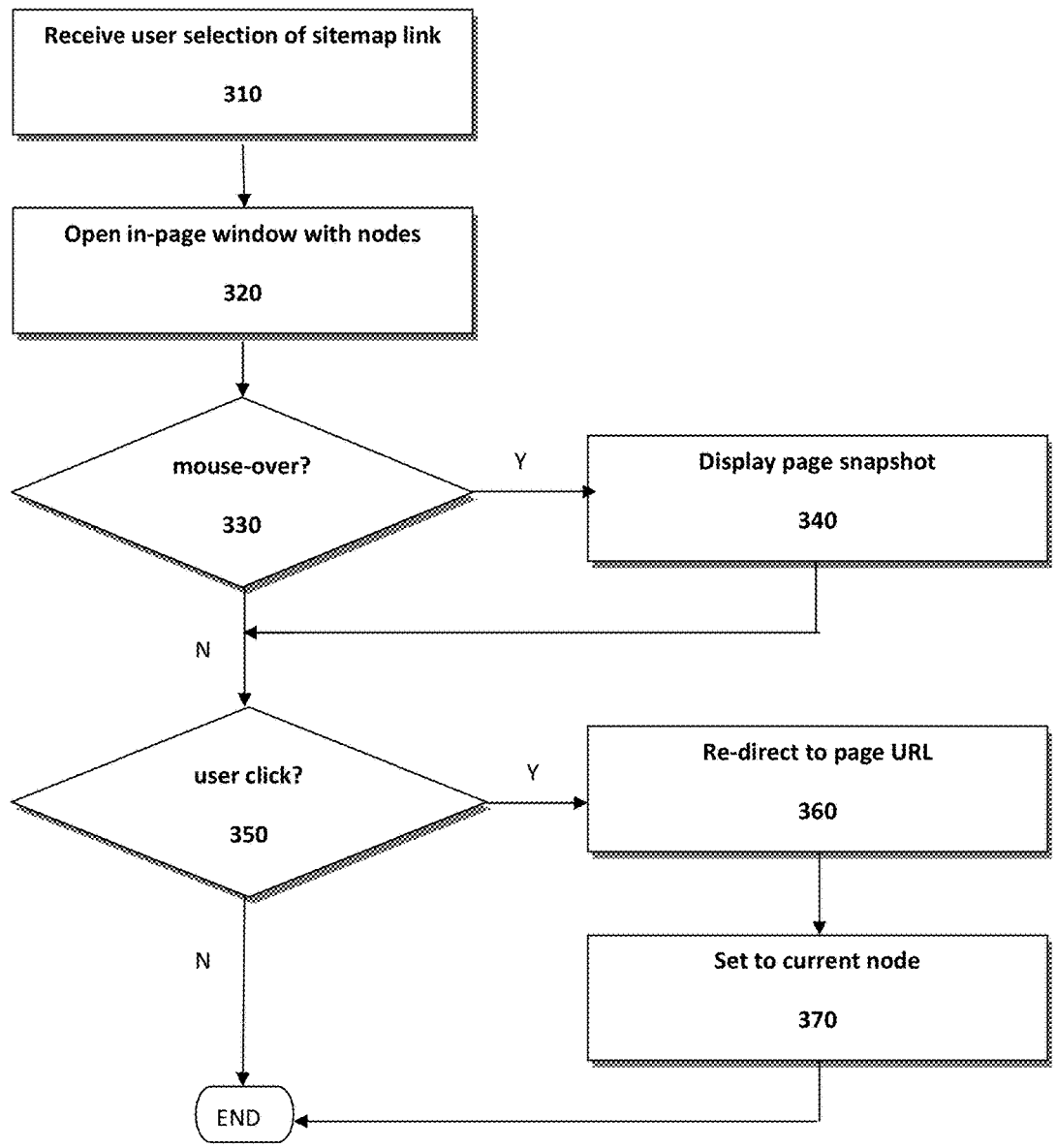
FIG. 3 is a high-level flowchart of the user interaction with the interactive sitemap, according to an embodiment of the present disclosure.

Referring now to FIG. 3, there is shown a high-level flowchart of the user interaction with the interactive sitemap, from the system's point of view, according to an embodiment of the present disclosure. First, in step 310 the interactive sitemap system receives the user's selection of the interactive sitemap from a website. The user can elect to use the interactive sitemap, rather than just the default sitemap, by clicking on a button or following a link as discussed above. In various embodiments of the present disclosure, we elect to place the UI button for the interactive sitemap in a prominent location, such as at a top of a website, rather than the very bottom area relegated to current sitemaps.

In response to the user's selection indicating a preference for the interactive sitemap, the interactive sitemap system presents an in-page, or "pop-up" window showing the sitemap tree with nodes representing the pages visited by this user in step 320. The in-page window is generated with known technology that is beyond the scope of this disclosure. As previously stated, the sitemap tree is also shown with default nodes. In decision step 330, if the user mouses over (or rolls over) one of the nodes representing a page URL, this indicates to the system that the user wishes to glance at that page. Accordingly, the system displays a snapshot preview of the page associated with the moused-over node in step 340, in response to the mouse-over.

If the user has clicked on a node in decision step 350, the system re-directs the user to the URL of the page associated with the clicked node in step 360. It should be noted that the selection of mousing-over and clicking are independent of each other, meaning that the user can mouse over and then click, or simply mouse-over, or simply click without first mousing-over. Once re-directed to the webpage, that webpage is set to the current node in the sitemap tree in step 370. The sitemap tree will show the node associated with the current page in a distinct manner such that the user can easily identify the current node.

Referring now to FIG. 4, we show a sitemap tree 400 according to an embodiment of the present disclosure. This sitemap tree 400 is what the user sees after clicking the sitemap link 475 on a website page. The tree 400 appears on an in-page window within the website. Clicking the sitemap link or UI button 475 triggers the opening of the in-page window shown in FIG. 4. The window displays the sitemap tree 400. Along the horizontal axis of the window the tree 400 displays the properties (main menu) 410 of the website. As shown in FIG. 4 the properties can be displayed with images 415 along with their names. These images 415 are themselves snapshots of the main page of each property. Along the vertical axis the user footprint/history 420 is represented in a hierarchical tree format. The user footprint/history 420 shows the pages visited by the user represented as nodes 450 on a tree. The node 480 representing the current page is emphasized. One with knowledge in the art will recognize that the horizontal/vertical order of the placement can be changed.

If the user hasn't yet visited any page of a certain property, the sitemap tree can be constructed with default/recommended nodes 455 such that the tree does not appear empty when the user first visits. The default/recommended nodes 455 will appear in a distinctive manner on the sitemap tree 400 such that the user can easily note the difference between visited nodes 450 and default/recommended nodes 455.

Figure 5:
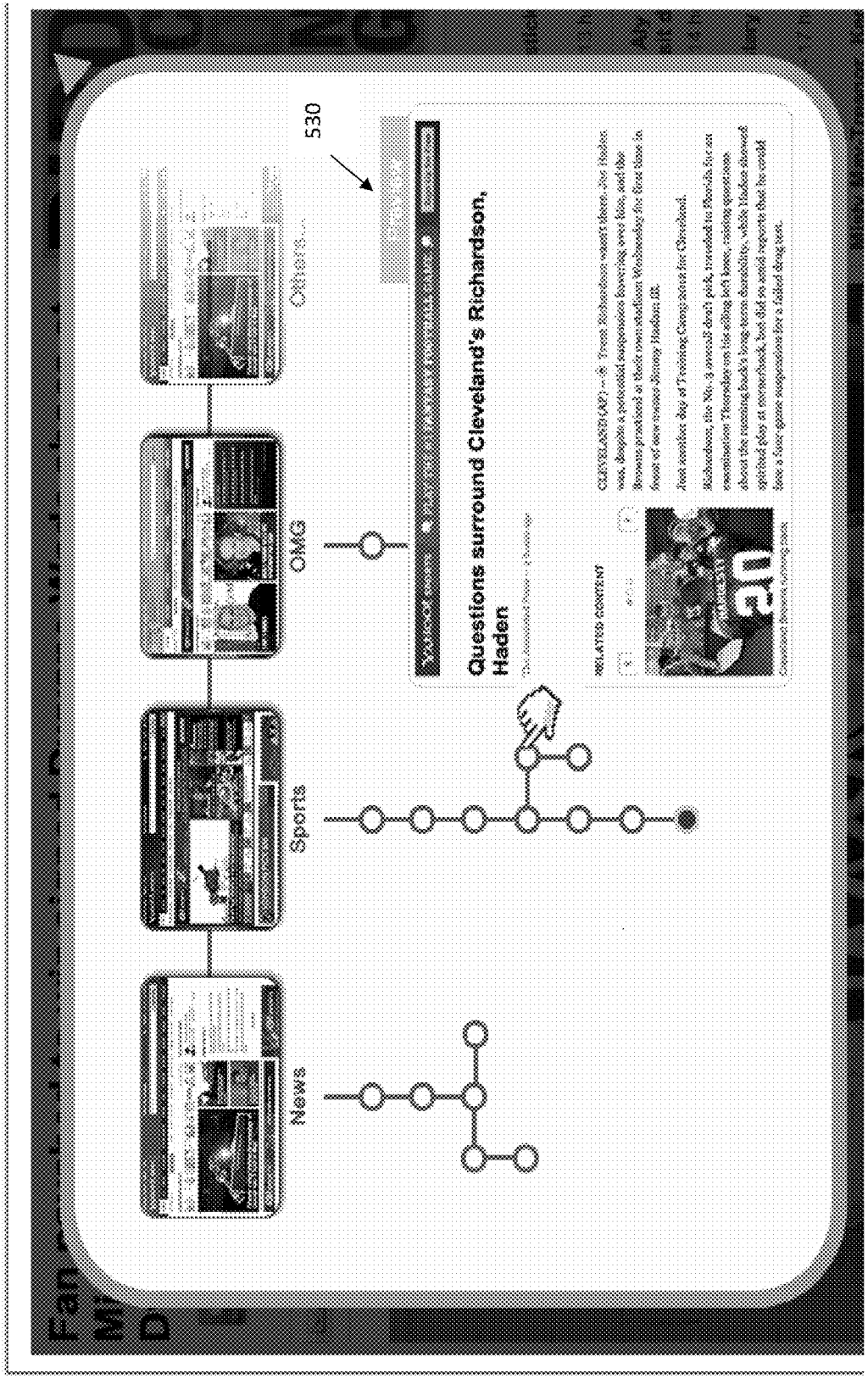
FIG. 5 shows a page snapshot displayed responsive to a mouse over on the interactive sitemap of FIG. 4, according to an embodiment of the present disclosure.

Referring now to FIG. 5, there is shown a sitemap tree 400 with a page snapshot 530 showing the page associated with the node moused over by the user, according to an embodiment of the present disclosure. When the user mouses over any node (450, 455, or 480), we display the page snapshot preview 530 for that node. Additionally, we can also display other relevant information such as the time/date that the user visited the page. Without the time/date display, the user can always tell at a glance which nodes are the most recently visited because they appear on the tips (ends) of each branch. This useful feature entails some back-end work that is transparent to the user. The system may have to re-organize the nodes on the sitemap tree 400 for repeated visits. For example, assume the user visits Sports Page A, then Sports Page B, then Finance Page A. The current node is Finance Page A. Then the user returns and visits Sports Page A. Sports Page A becomes the current node and it is also moved to the "tip" of the sports branch, replacing Sports Page B on the tip.

Figure 6:
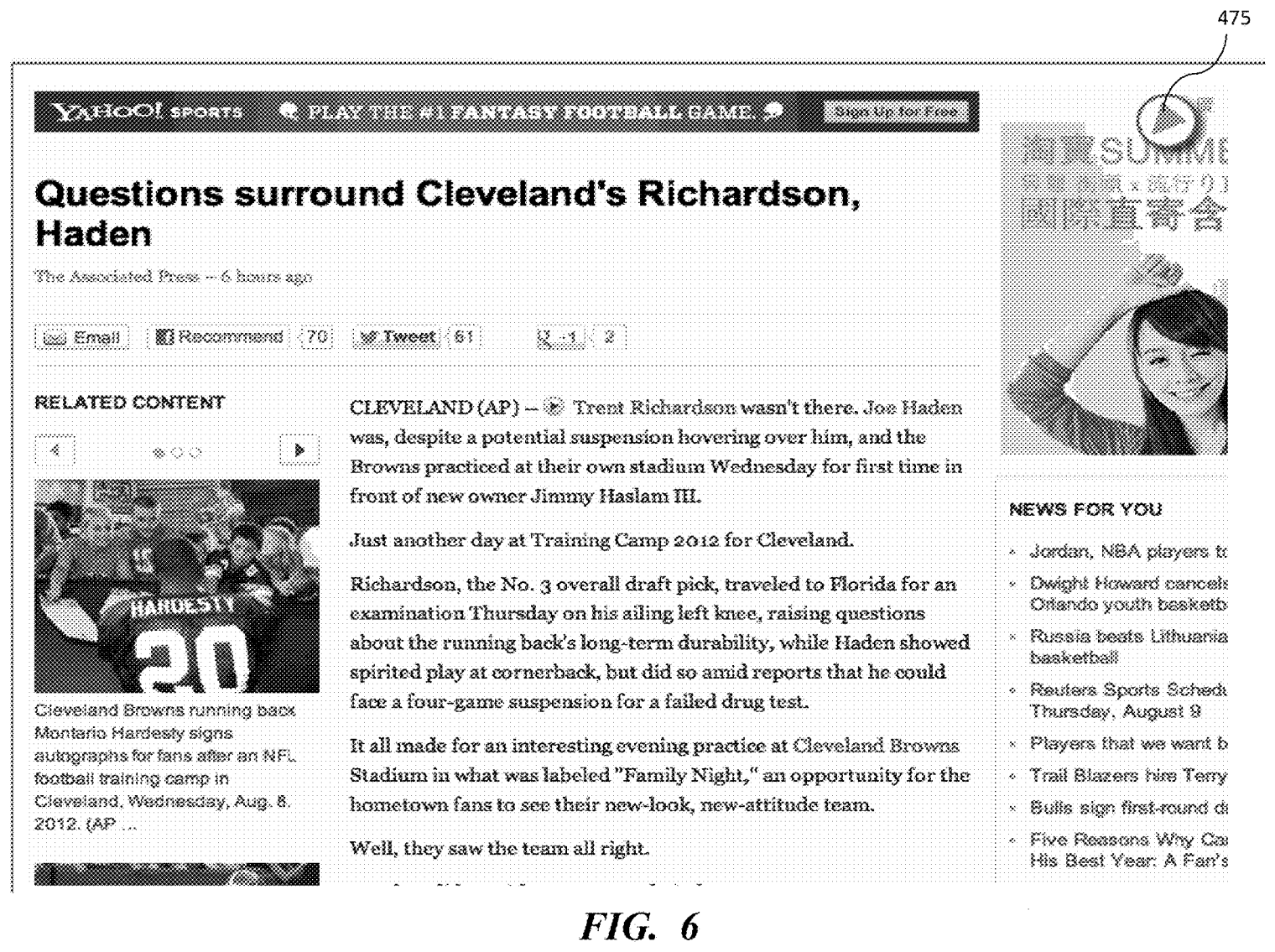

Referring now to FIG. 6, we show the page redirect after the user clicks on a node 450. Note that once the user is re-directed to a page, the node associated with that page then becomes the current node 480 and is emphasized in some manner, such as colored-in, highlighted, blinking, or the like.

Social Network Feature.

Figure 12:
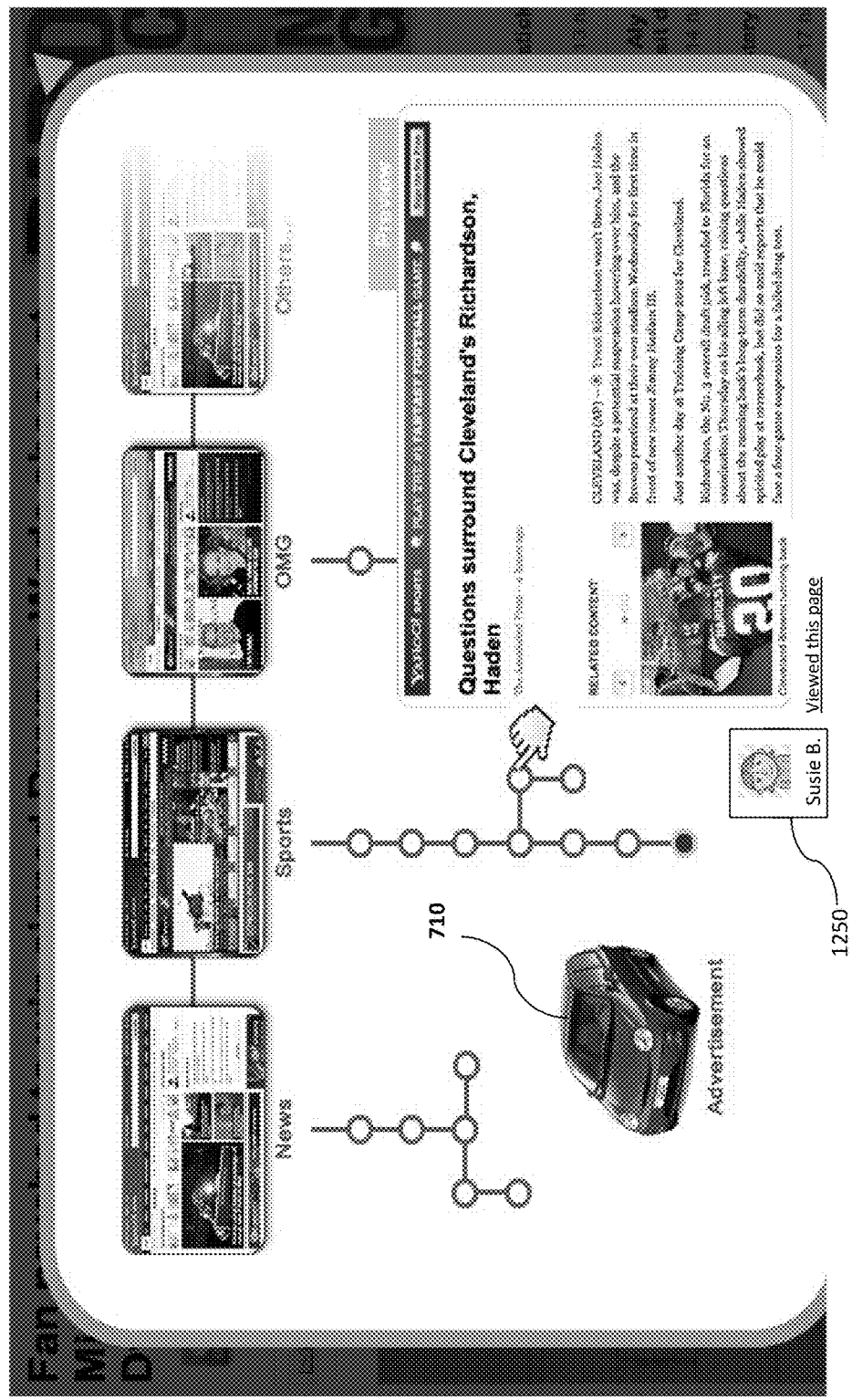
FIG. 12 is an exemplary illustration of the social connection feature, according to an embodiment of the present disclosure.

Referring now to FIG. 12, we show an exemplary illustration of the social network feature, according to an embodiment of the present disclosure. When this feature is enabled, the node snapshot 530 will include, in close proximity or within the display, the user's social connections who have been visiting that same page. The social connections 1250 can be shown with their respective social site photo and/or their user name.

Recommended Pages Feature.

Figure 13:
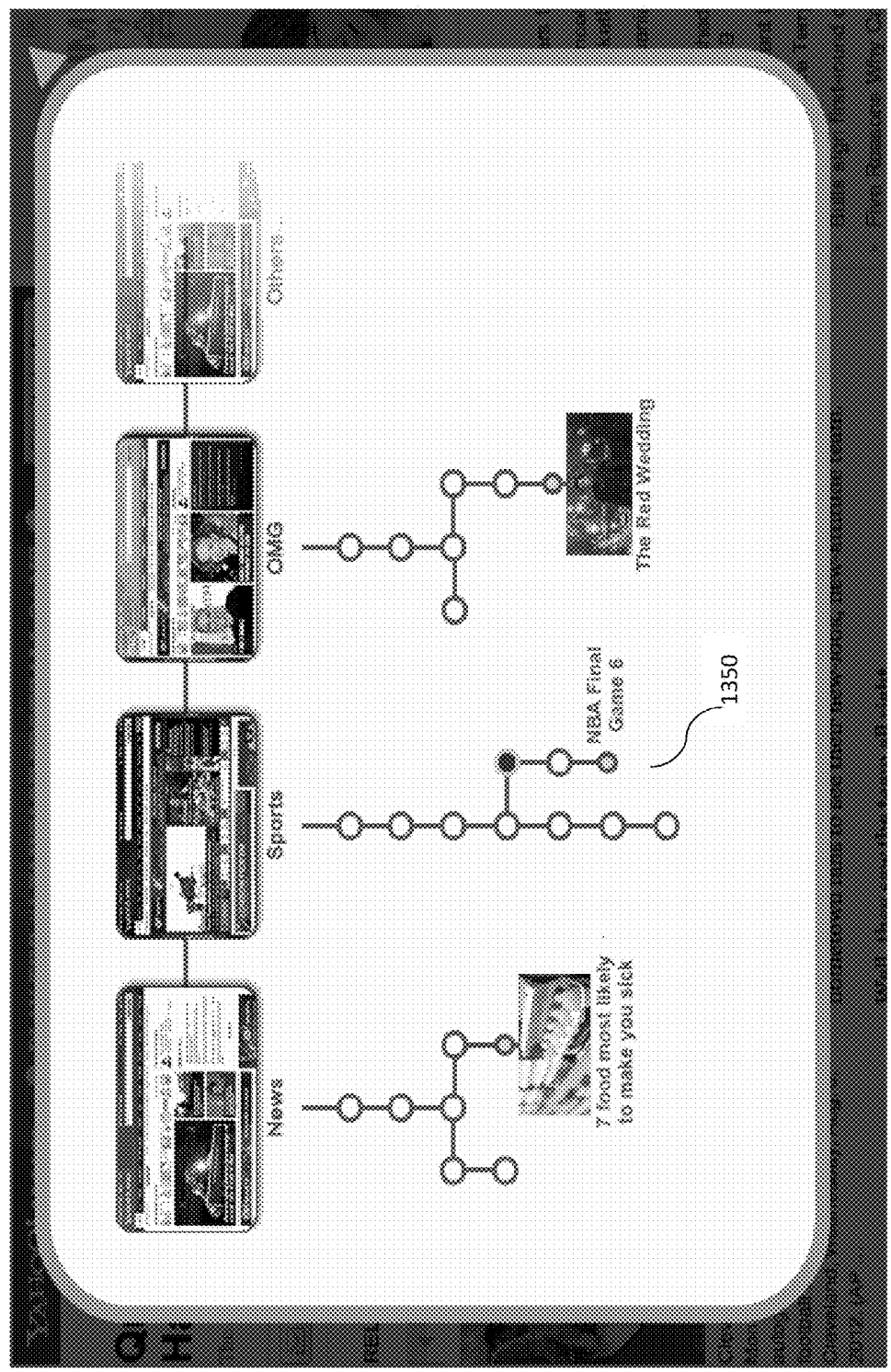
FIG. 13 is an exemplary illustration of the recommended pages feature, according to an embodiment of the present disclosure.

Referring now to the illustration of FIG. 13, we support a Recommended Pages Feature in order to make the interactive sitemap 400 even more meaningful. With this feature enabled, the user will see some smaller nodes 1350 placed near the sitemap nodes 450. These smaller nodes 1350 represent pages that are recommended for the user based on the user's tree traversals.

Monetization Feature.

Figure 7:
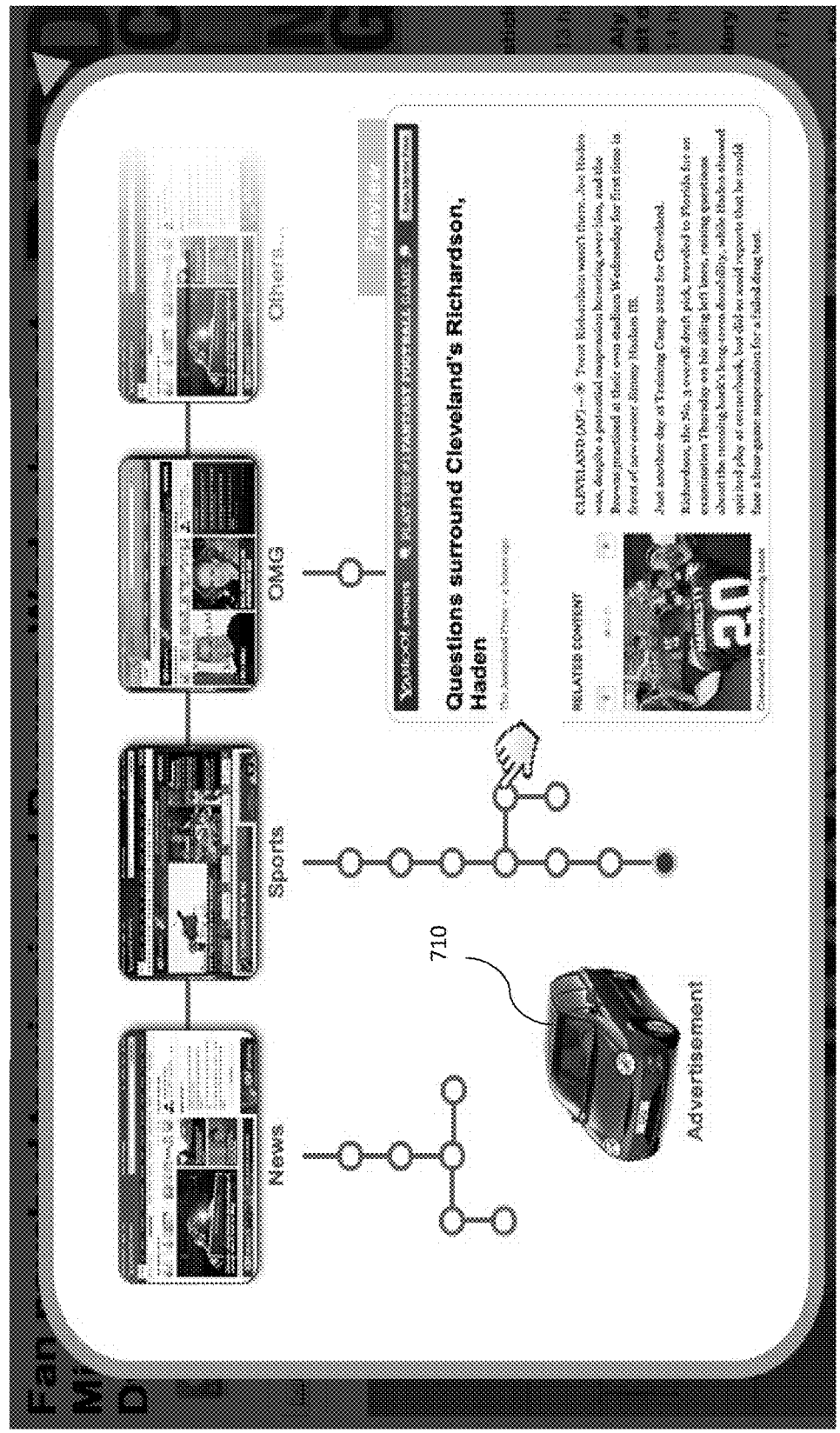
FIG. 7 shows an interactive sitemap incorporating an advertisement, according to an embodiment of the present disclosure.

Referring now to FIG. 7 we show a method of monetizing the interactive sitemap. Here we show an advertisement 710 placed within the sitemap 400. The selection of which advertisement 710 to display can be triggered by the user mousing over a node inside the sitemap tree 400. The advertisement 710 may be selling a product tied to content of that page or a product that is geared to user profiles of users who select that page. There are many different ways that advertisements are selected that are beyond the scope of this document. Whichever advertisement 710 is selected can be displayed with the snapshot 530 as a way of monetizing.

Figure 8:
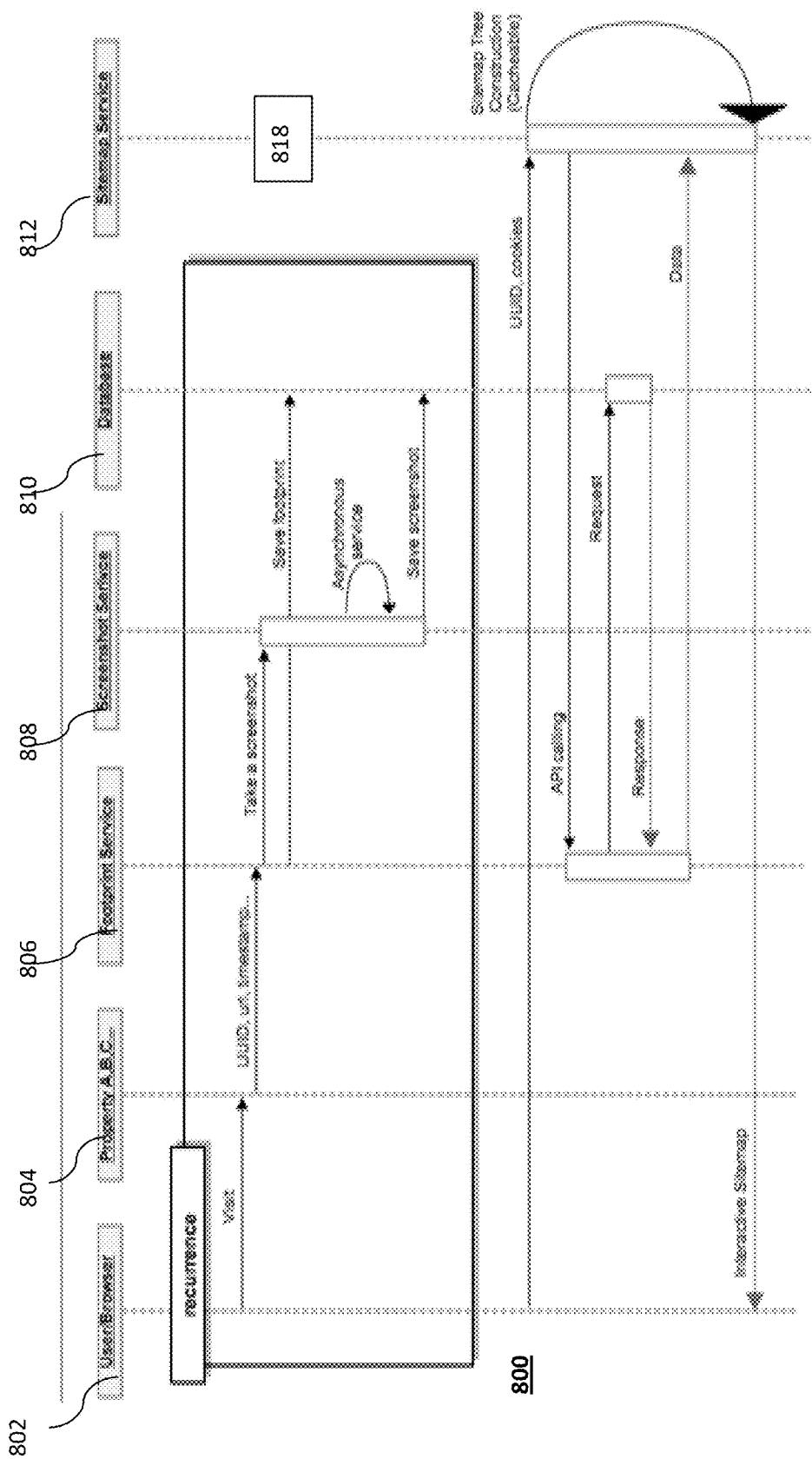
FIG. 8 shows an interactive sitemap sequence diagram, according to an embodiment of the present disclosure.

Referring now to FIG. 8 there is shown an interactive sitemap sequence diagram 800, according to an embodiment of the present invention. The sequence diagram 800 shows the sequence of steps performed in order to first generate an interactive sitemap for a user and also the process for interacting with a user on a generated interactive sitemap. Along the horizontal axis of this diagram 800, along the top, we see the different components (physical and/or logical)

that perform the sequence of steps within the interactive sitemap system. First we see the user's browser 802 that visits a website. The website has various Properties 804, or main functions, that sub-divide the website. For example, Yahoo! has the properties Mail, News, Sports, Finance, and others. Each time a user initially visits a page in one of these properties, the system generates a new column in the sitemap tree 400. For an initial visit, the tree 400 is constructed with a default set of Properties 804.

Next we see the Footprint Service 806 which records the UUID, the URL of the webpage visited, and the timestamp. A UUID is a "universally unique identifier" that identifies the visitor to the website and the visitor's travels within the website. This information is stored in either a data store or in the user's browser cookies. Then the Screenshot Service 808 takes a screenshot or snapshot 530 of the pages the user visits. The information acquired by the Footprint Service 806 is saved as a user footprint in the Database 810. What has just been described with respect to FIG. 8 is the process performed to generate an interactive sitemap 400. These steps are performed for each recurring visit.

Figure 9:
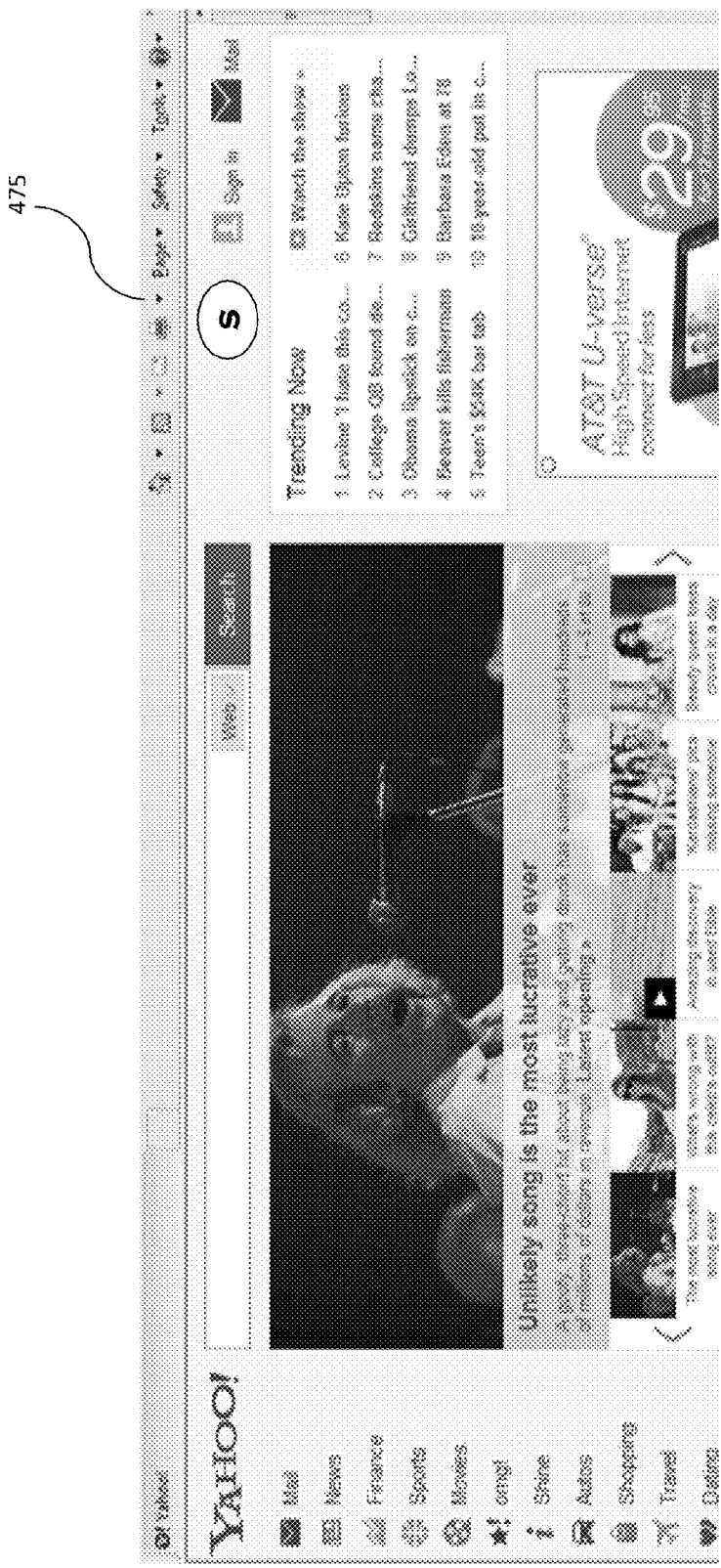
FIG. 9 shows an example of an interactive sitemap UI button, according to an embodiment of the present disclosure.

Now moving to the bottom portion of the diagram 800, we begin with the Sitemap Service 812 which is activated when the user selects the service by clicking on the UI button 475, or by some other manner. FIG. 9 shows another example of a UI button 475 used to activate the interactive sitemap. The Sitemap Service 812 collects the UUID, cookies, URLs, and other information that is stored in the Database 810 for this user and calls a Sitemap Generator 818 to construct a Sitemap Tree 400 that is cacheable. The Sitemap Tree 400 is presented to the user as an interactive sitemap in an in-page window. If the user mouses over a node 450 in the Sitemap Tree 400, an API (application program interface) requests the appropriate screenshot from the Database 810 and then responds to the user with a snapshot image 530 of the page associated with the moused-over node. Clicking on the node 450 will re-direct the user to the node's page.

Figure 10:
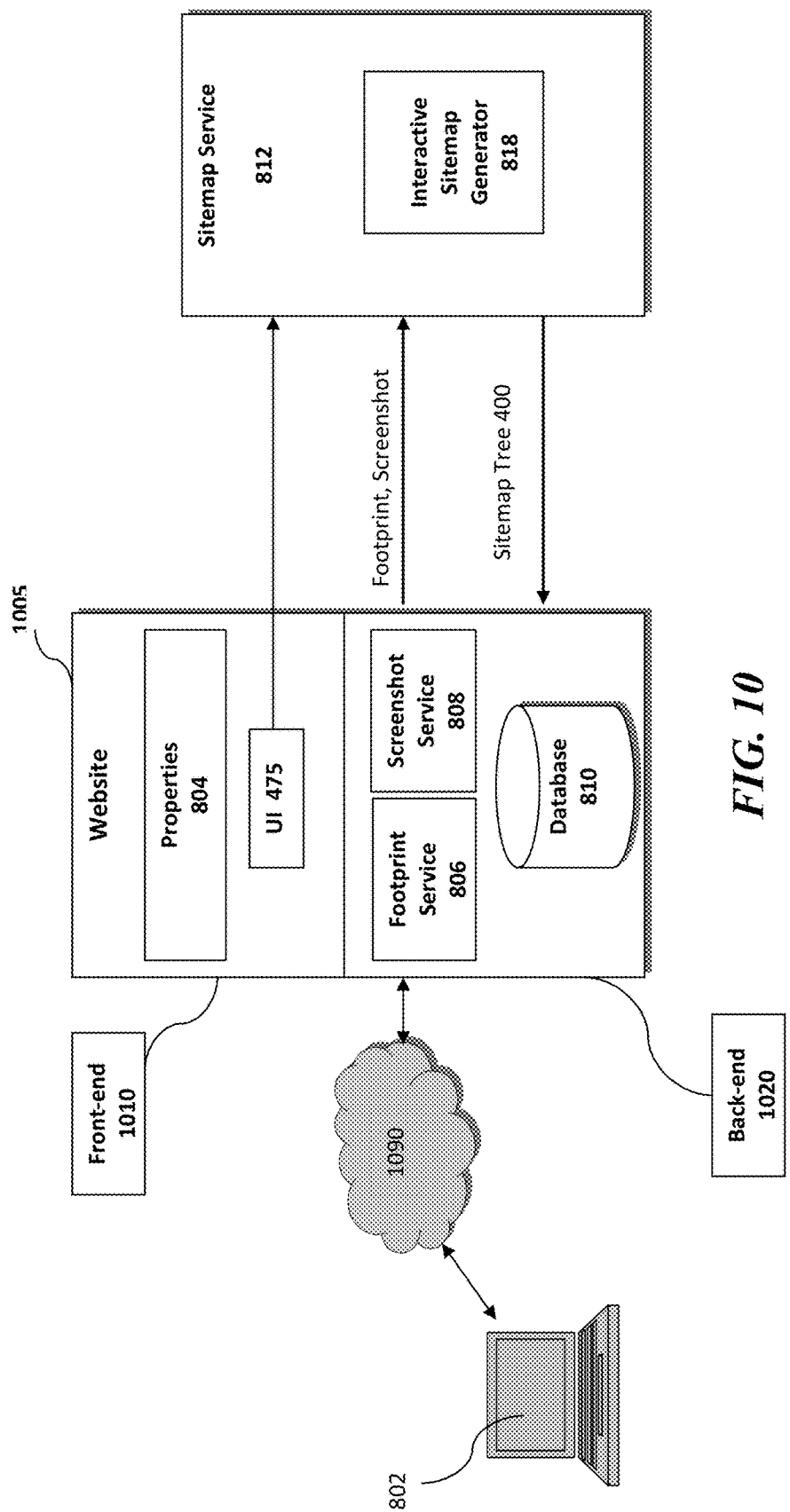
FIG. 10 shows a simplified system overview of the interactive sitemap system, according to an embodiment of the present disclosure.

Referring now to FIG. 10 there is shown a high-level block diagram representing the components in the interactive sitemap system. We begin with the user's browser 802 which accesses a Website 1005 through a network such as the Internet 1090. The front-end processing 1010 of the Website 1005 contains the website Properties 804 as well as the UI button 475 for activating the interactive sitemap 400. The back-end processing 1020 of the Website 1005 contains the Footprint Service 806, the Screenshot Service 808, and the Database 810. The Sitemap Service 812 is activated through the UI 475 and interacts with the back-end processing 1020 to generate a Sitemap Tree 400 through the Interactive Sitemap Generator 818.

Those skilled in the art will appreciate that the functionality implemented within the blocks illustrated in the diagram may be implemented as separate components or the functionality of several or all of the blocks may be implemented within a single component. For example, the functionality for the Screenshot Service 808 may be included in the same component as the Footprint Service 806. Or the functionality of the Sitemap Generator 818 may be implemented as a separate component from the Sitemap Service 812. Processing is preferably performed using Java-based technologies, although other similar technologies now known or subsequently developed may be used for the processing.

Figure 11:
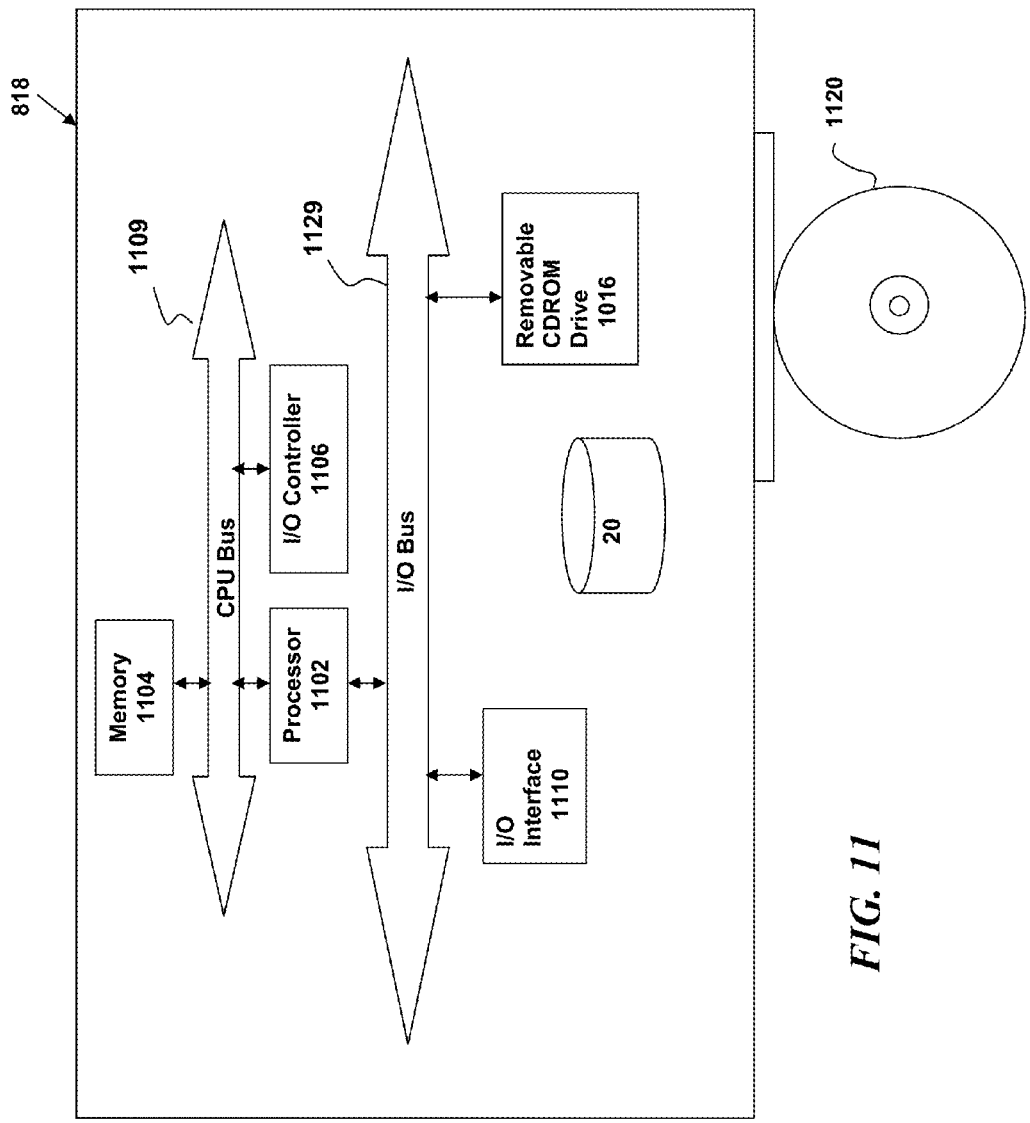
FIG. 11 is a high-level block diagram of the components of the Sitemap Generator, according to an embodiment of the present disclosure.

FIG. 11 Hardware Embodiment.

Referring now in specific detail to the drawings, and particularly FIG. 11, there is provided a simplified pictorial illustration of the hardware components of an information processing system for generating an interactive sitemap in which the present invention may be implemented. For purposes of this invention, the illustrated computer system is the Sitemap Generator 818. Computer system 818 may represent any type of computer, information processing system or other programmable electronic device, including a client computer, a server computer, a portable computer, an embedded controller, a personal digital assistant, and so on. The computer system 818 may be a stand-alone device or networked into a larger system. Computer system 818, illustrated for exemplary purposes as a networked computing device, is in communication with other networked computing devices (not shown) via a network such as the Internet 1090.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 818. As will be appreciated by those of ordinary skill in the art, aspects of the invention may be distributed amongst one or more networked computing devices which interact with computer system 818 via one or more data networks. However, for ease of understanding, aspects of the invention have been embodied in a single computing device—computer system 818.

Computer system 818 includes processing device 1102 which communicates with an input/output subsystem 1106, memory 1104, and storage 1110. The processor device 1102 is operably coupled with a communication infrastructure 1109 (e.g., a communications bus, cross-over bar, or network). The processor device 1102 may be a general or special purpose microprocessor operating under control of computer program instructions executed from memory 1104 on program data. The processor 1102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1104 may be partitioned or otherwise mapped to reflect the boundaries of the various memory subcomponents. Memory 1104 may include both volatile and persistent memory for the storage of: operational instructions for execution by CPU 1102, data registers, application storage and the like. Memory 1104 preferably includes a combination of random access memory (RAM), read only memory (ROM) and persistent memory such as that provided by a hard disk drive. The computer instructions/applications that are stored in memory 1104 are executed by processor 1102. The computer instructions/applications and program data can also be stored in a hard disk drive for execution by processor device 1102.

The I/O subsystem 1106 may include various end user interfaces such as a display, a keyboards, and a mouse. The I/O subsystem 1106 may further include a connection to a network 1090 such as a local-area network (LAN) or wide-area network (WAN) such as the Internet.

The computer system 818 may also include a removable storage drive 1116, representing a floppy disk drive, a magnetic tape drive, an optical disk drive, etc. The removable storage drive 1116 reads from and/or writes to a removable storage unit 1120 in a manner well known to those having ordinary skill in the art. Removable storage unit 1120, represents a floppy disk, a compact disc, magnetic tape, optical disk, CD-ROM, DVD-ROM, etc. which is read by and written to by removable storage drive 1110. As will be appreciated, the removable storage unit 1120 includes a non-transitory computer readable medium having stored therein computer software and/or data.

The computer system 818 may also include a communications interface 1110. Communications interface 1110 allows software and data to be transferred between the computer system and external devices. Examples of communications interface 1110 may include a modem, a network interface (such as an Ethernet card), a communications port, a PCMCIA slot and card, etc. Software and data transferred via communications interface 1110 are in the form of signals which may be, for example, electronic, electromagnetic, optical, or other signals capable of being received by communications interface 1110.

In this document, the terms "computer program medium," "computer usable medium," and "computer readable medium" are used to generally refer to both transitory and non-transitory media such as main memory 1104, removable storage drive 1120, a hard disk installed in hard disk drive, and signals. These computer program products are means for providing software to the computer system 818. The computer readable medium 1120 allows the computer system 818 to read data, instructions, messages or message packets, and other computer readable information from the computer readable medium 1120.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method, comprising:
   using a processor device, performing:
      receiving a user identifier of a user visiting a website;
      storing a website page identifier of a first website page visited by the user;
      associating the website page identifier with the user identifier;
      capturing a snapshot of the first website page;
      determining a second website page recommended for the user, but not yet visited by the user;
      capturing a snapshot of the second website page;
      generating an interactive sitemap comprising a sitemap tree structure of the website with a first selectable node representing the first website page and a second selectable node representing the second website page; and
      presenting the interactive sitemap, comprising:
         displaying, along a first axis, a first property of the website as a first branch of the sitemap tree structure and a second property of the website as a second branch of the sitemap tree structure;
         displaying, along a second axis and in association with the first branch, selectable nodes associated with the first property, wherein each selectable node displayed in association with the first branch represents at least one of a website page visited by the user or a website page recommended for the user;
         displaying, along the second axis and in association with the second branch, selectable nodes, comprising the first selectable node and the second selectable node, associated with the second property, wherein each selectable node displayed in association with the second branch represents at least one of a website page visited by the user or a website page recommended for the user, wherein the first selectable node is displayed at a tip of the second branch;
         re-organizing one or more nodes of the interactive sitemap, comprising responsive to a selection associated with the second selectable node, replacing, at the tip of the second branch, the first selectable node with the second selectable node;
         responsive to a mousing over of a third selectable node of the interactive sitemap, displaying a third social site photo of a third social connection that visited a third website page represented by the third selectable node; and
         responsive to a mousing over of a fourth selectable node of the interactive sitemap, displaying a fourth social site photo of a fourth social connection that visited a fourth website page represented by the fourth selectable node.

2. The method of claim 1, wherein the selection associated with the second selectable node corresponds to a visit to the second website page represented by the second selectable node.

3. The method of claim 1, wherein the first axis is different than the second axis.

4. The method of claim 1, comprising:
   representing a current web page with a current selectable node emphasized such that it is distinct from other selectable nodes.

5. The method of claim 1, comprising:
   generating a selectable icon on the website, the icon enabling a user to activate the interactive sitemap.

6. The method of claim 1, comprising presenting an advertisement.

7. The method of claim 1, comprising:
   receiving an indication that the user has selected the third selectable node; and
   re-directing the user to the third website page represented by the third selectable node.

8. The method of claim 1, wherein at least one of capturing the snapshot of the first website page or capturing the snapshot of the second website page comprise using cache functionality.

9. The method of claim 8, wherein using the cache functionality comprises:
periodically capturing a portion of at least one of the first website page or the second website page at pre-determined time intervals.

10. The method of claim 8, wherein using the cache functionality comprises:
capturing a portion of at least one of the first website page or the second website page responsive to determining a change to at least one of the first website page or the second website page.

11. The method of claim 1, comprising:
when there is insufficient user history of web pages visited, populating the sitemap tree structure with default selectable nodes.

12. The method of claim 1, comprising presenting an icon indicating a social connection of the user that has viewed the website page.

13. The method of claim 1, wherein the second selectable node is presented in a smaller scale than the first selectable node.

14. An information processing system, comprising:
a processor device; and
a memory operably coupled with the processor device, the memory storing computer-executable instructions that when executed by the processor device perform operations comprising:
determining a first website page one of:
visited by a user; or
recommended for the user, but not yet visited by the user;
capturing a snapshot of the first website page, wherein capturing the snapshot of the first website page comprises using cache functionality;
generating an interactive sitemap comprising a sitemap tree structure of a website with a first selectable node representing the first website page; and
presenting the interactive sitemap, comprising:
displaying, along a first axis, a first property of the website as a first branch of the sitemap tree structure and a second property of the website as a second branch of the sitemap tree structure;
displaying, along a second axis and in association with the first branch, selectable nodes associated with the first property, wherein each selectable node displayed in association with the first branch represents at least one of a website page visited by the user or a website page recommended for the user;
displaying, along the second axis and in association with the second branch, selectable nodes, comprising the first selectable node and a second selectable node, associated with the second property, wherein each selectable node displayed in association with the second branch represents at least one of a website page visited by the user or a website page recommended for the user, wherein the first selectable node is displayed at a tip of the second branch; and
re-organizing one or more nodes of the interactive sitemap, comprising responsive to a selection associated with the second selectable node, replacing, at the tip of the second branch, the first selectable node with the second selectable node.

15. The information processing system of claim 14, wherein using the cache functionality comprises:
capturing a portion of the first website page at a time of visit or at a time of website page refresh.

16. The information processing system of claim 14, wherein the first property is different than the second property.

17. The information processing system of claim 14, wherein using the cache functionality comprises:
capturing a portion of the first website page at pre-determined time intervals.

18. The information processing system of claim 14, wherein the selection associated with the second selectable node corresponds to a visit to a second website page represented by the second selectable node.

19. A computer program product comprising a non-transitory computer-readable storage medium with computer-executable instructions stored thereon, the computer-executable instructions, when executed, performing operations comprising:
determining a first website page one of:
visited by a user; or
recommended for the user, but not yet visited by the user;
capturing a snapshot of the first website page, wherein capturing the snapshot of the first website page comprises using cache functionality comprising periodically capturing a portion of the first website page at one or more pre-determined time intervals;
generating an interactive sitemap comprising a sitemap tree structure of a website with a first selectable node representing the first website page; and
presenting the interactive sitemap, comprising:
displaying, along a first axis, a first property of the website as a first branch of the sitemap tree structure and a second property of the website as a second branch of the sitemap tree structure;
displaying, along a second axis and in association with the first branch, selectable nodes associated with the first property, wherein each selectable node displayed in association with the first branch represents at least one of a website page visited by the user or a website page recommended for the user;
displaying, along the second axis and in association with the second branch, selectable nodes, comprising the first selectable node and a second selectable node, associated with the second property, wherein each selectable node displayed in association with the second branch represents at least one of a website page visited by the user or a website page recommended for the user, wherein the first selectable node is displayed at a tip of the second branch; and
re-organizing one or more nodes of the interactive sitemap, comprising responsive to a selection associated with the second selectable node, replacing, at the tip of the second branch, the first selectable node with the second selectable node.

20. The computer program product of claim 19, wherein the first property is different than the second property.

* * * * *